May 13, 1930. S. E. SKINNER 1,758,177
ELECTRICALLY HEATED PAD
Filed Feb. 15, 1924

Inventor
Sherrod E Skinner
By W. Clay Lindsey
His Attorney

Patented May 13, 1930

1,758,177

UNITED STATES PATENT OFFICE

SHERROD E. SKINNER, OF NEW BRITAIN, CONNECTICUT, ASSIGNOR TO LANDERS, FRARY & CLARK, OF NEW BRITAIN, CONNECTICUT, A CORPORATION OF CONNECTICUT

ELECTRICALLY-HEATED PAD

Application filed February 15, 1924. Serial No. 692,982.

The present invention relates to electrically heated pads of the sort having a resistance wire (or resistance wires) located within a flexible pad, blanket or the like, the resistance wire being preferably in the form of a coil with its convolutions distributed in the pad so as to uniformly heat the same throughout its area. It is customary to wrap the resistance wire, or wires, with a suitable insulating material, such as braided asbestos, in an endeavor to prevent the resistance wire, when heated, from setting fire to the material of which the pad is made. Heating pads of this sort have been manufactured and sold having automatically operated cut-offs or thermostats that will open the circuit through the resistance wire, or wires, when the temperature reaches a predetermined point.

One objection to heating pads, as heretofore manufactured and sold, has been the likelihood of them being set afire in case the resistance wire, or wires, were short-circuited. This risk of fire was particularly likely, as it was possible, by sticking pins in the pad, as is very frequently done by users of the same, to cause a short circuit which would cut out the protective thermostat, or thermostats, thereby rendering the latter inoperative.

The aim of the present invention is to entirely eliminate all danger of the pad from catching afire in the event that the resistance wire, or wires, or a portion of them, should become short-circuited, as by means of a pin which might be stuck into the pad. To this end, I provide each resistance wire with at least two thermostats, one positioned at each extreme end of the resistance circuit, so that there will be no possibility of short-circuiting in such manner that all of the thermostats would be rendered inoperative; that is to say, irrespective as to where the resistance unit may be short-circuited, there will always be at least one thermostat in circuit.

I provide my electrically heated pad with thermostats of the type shown in the N. E. Mann patent, Reissue No. 14,286, dated April 17, 1917, and each having a thermostatic strip or bar which, when heated to a predetermined temperature, will interrupt the circuit. When the thermostat falls below the temperature at which it is set to open the circuit, the bar will again close the circuit. The thermostatic bar is not heated by the current which is passed through it but by the heat which is conveyed to the bar from the surrounding medium. Heretofore, one objection to thermostats of this sort, when applied to heating pads, has been that there is a lag or discrepancy, so to speak, between the temperature of the pad and the temperature at which the thermostat will operate; that is to say, the pad will have reached a somewhat higher temperature than that at which the thermostat is set to open the circuit because some time is required for the heat of the pad to be conveyed to the thermostatic bar. An aim of the present invention is to correct this defect or objection, and to that end I closely associate with the thermostatic bar a resistance wire in circuit with the heating unit and which will heat the thermostat in the same degree and at the same rate as will the resistance coil heat the pad. This means that the thermostat may be accurately adjusted to operate with nicety at a predetermined degree of heat and thus the temperature of the pad, as a whole, is controlled within very close limits.

Other objects will be in part obvious and in part pointed out more in detail hereinafter.

The invention accordingly consists in the features of construction, combinations of elements and arrangement of parts which will be exemplified in the construction hereinafter set forth, and the scope of the application of which will be indicated in the appended claims.

In the accompanying drawing, wherein I have shown, for illustrative purposes, two embodiments which the present invention may take;

Figure 1:
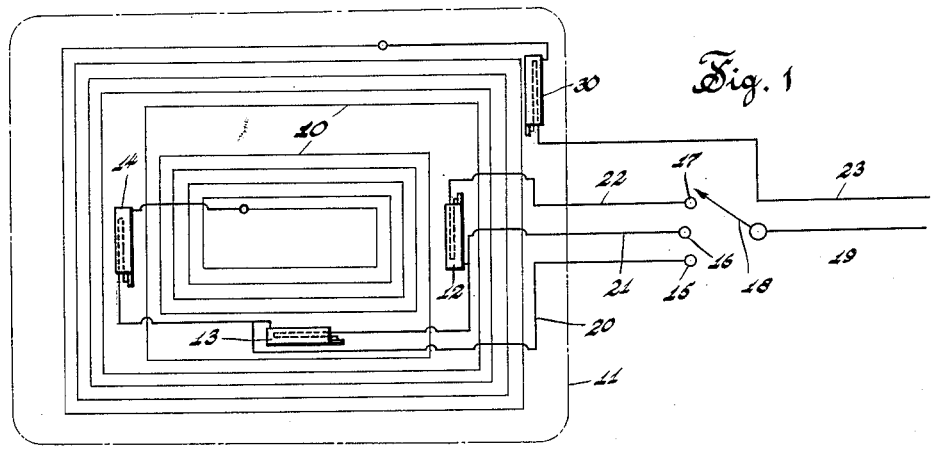
Figure 1 is a diagrammatic view of a warming pad of the three heat type and embodying my improvement.

Referring to Fig. 1 of the drawing, which illustrates a common form of electric warming pad, 10 designates a heating wire or resistor which is located within or between the layers of the pad 11, the outline of the latter being shown in dotted lines. The heating wire is in the form of a coil having concentric convolutions more or less uniformly distributed throughout the area or compass of the pad. The resistance coil is provided at one end with three thermostats 12, 13 and 14 which are set to break the circuit at different degrees of heat; for instance, the thermostat 12 is set for 120°, which may be termed "low" temperature; the thermostat 13, for 150° (medium temperature), and the thermostat 14, for 180° (high temperature). These temperatures are selected merely for the purpose of illustration. These thermostats may be connected in series, as shown, or in multiple, as desired. For the purpose of selectively connecting the thermostats with the resistance coil, a manually operable switch having contact terminals 15, 16 and 17 and a switch arm 18 may be provided. The switch arm is connected to a conductor or line wire 19. A connecting wire 20 leads from a point between the thermostats 14 and 13 to the contact terminal 15, a second wire 21 leads from a point between the thermostats 13 and 12 to the contact 16, and a third wire leads from the thermostat 12 to the contact 17. When the switch arm is in engagement with the contact terminal 15, the current flows through the coil 10 and the thermostat 14. As soon as the temperature reaches the point at which the thermostat 14 is set, in the present instance 180°, this thermostat will open, thereby breaking the circuit until the temperature of the pad has been reduced a few degrees, when the thermostat will again close and throw the circuit on. If a medium heat is desired, the switch arm is brought into contact with the middle terminal 16, and if a low temperature is wanted, the switch arm will be turned to engage the terminal contact 17. The conductor which leads to the other end of the coil is designated by the numeral 23. The arrangement so far described is similar to that illustrated in the said Mann reissue patent. If desired, the conductors 19 and 23 may be enclosed in a cable in which is interposed the controlling switch.

It will be seen that the thermostats 12, 13 and 14 are positioned at one end of the coil 10. In accordance with the present invention, I provide, at the other or beginning end, so to speak, of the coil, a thermostat 30 which preferably is set to operate at about the same temperature as the thermostat 14. Thus, there is provided at each end of the unit at least one thermostat so that in the event the wires should become short-circuited at any point within the pad, there will always be one thermostat in circuit and, thus, danger of the pad catching fire because of a short-circuit is entirely eliminated. It will be clear that, should a pin be stuck into the pad and so short-circuit the wires that the thermostats 12, 13 and 14 would be thrown out of circuit, the temperature of the pad would rise, but when it had reached the degree of heat 180°) at which the thermostat 30 is set to operate, this thermostat would open the circuit and thus break the current through the coil before the resistance unit will reach a degree of heat at which it would burn the material of the pad.

Figure 2:
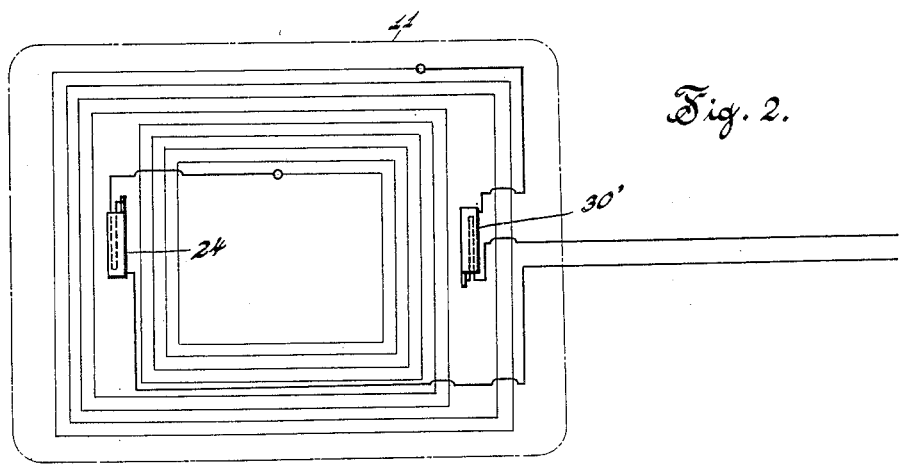
Fig. 2 is a view similar to Fig. 1, but shows but a single heat pad.

In Fig. 2, I have shown a single heat pad. In this instance, the thermostat 24, located at one end of the resistance coil, normally controls the temperature of the pad. At the other end of the coil is a thermostat 30' which serves the same purpose as the corresponding thermostat of Fig. 1. In the event that a short-circuit should take place, which would cut the thermostat 24 out of circuit, the thermostat 30' will prevent the pad from being heated to such a degree that fire would take place.

Figure 3:
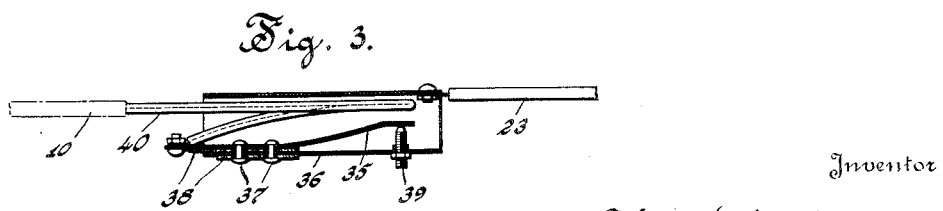
Fig. 3 is a detail view showing, in longitudinal section, the thermostat provided with a resistance wire to equalize the heating of the pad and the thermostatic bar.

In Fig. 3, I have shown in detail one form of thermostat which may be employed for controlling the heat of the pad. This thermostat includes a thermostatic or bi-metal bar 35 connected within a tubular casing 36 by rivets 37. The bar and rivets are insulated from the casing by washers 38. 39 is an adjustable contact in the form of a screw threaded into the casing 36. This form of thermostat is a common one. When the thermostatic bar is heated, it will, owing to the fact that it is made of two metals having different co-efficients of expansion, flex out of engagement with the screw 39, thereby breaking the circuit. When the thermostatic bar cools slightly, it will again engage the screw 39. The temperature of the thermostatic bar is raised by the heat conveyed to it through the surrounding medium. Heretofore, it has been found that the temperature of the thermostatic bar lags behind that of the pad. In order to eliminate this lag, I provide, in close proximity to the thermostatic bar, a resistance wire 40 which is in circuit with the coil 10. In the present instance, this wire is in the form of a bight or loop positioned in the tubular casing 36 of the thermostat. If desired, this wire may be part of the coil 11, but, preferably, it is of slightly greater resistance, per unit of length, than the coil so that it will radiate a sufficient amount of heat to insure that the thermostatic bar 35 will be heated to the same degree, and at the same rate, as is the pad. Owing to the fact that this resistance wire prevents a lag in temperature between the thermostatic bar and the pad and thus equalizes, so to speak, the temperature therebetween, the thermostat may be set with great nicety to operate when the temperature of the pad has reached a predetermined degree. The thermostat will operate with uniformity and assurance at the predetermined desired temperature.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a warming pad of the character described, a pad, a resistance circuit distributed therein, and a thermostat positioned at each extreme end of said circuit and adapted to open the circuit when a predetermined degree of temperature is reached.

2. In a warming pad of the character described, a pad, a resistance coil carried thereby, a plurality of thermostatic circuit controlling devices at one end of said coil and set for operation at different degrees of heat, and a thermostat at the other extreme end of said coil set for operation at the highest temperature at which any one of the said first mentioned thermostats is set to operate.

3. In a warming pad of the character described, a pad, a resistance coil carried thereby, a thermostat carried by said pad in circuit with said coil and having a casing and a thermostatic bar therein adapted to break the circuit when the pad reaches a predetermined degree of heat, and a resistance wire within said casing and in circuit with said coil for heating said thermostatic bar.

SHERROD E. SKINNER.